M. C. OVERMAN.
SECURING MEANS FOR VEHICLE TIRES.
APPLICATION FILED JAN. 13, 1913.
1,203,648.
Patented Nov. 7, 1916.
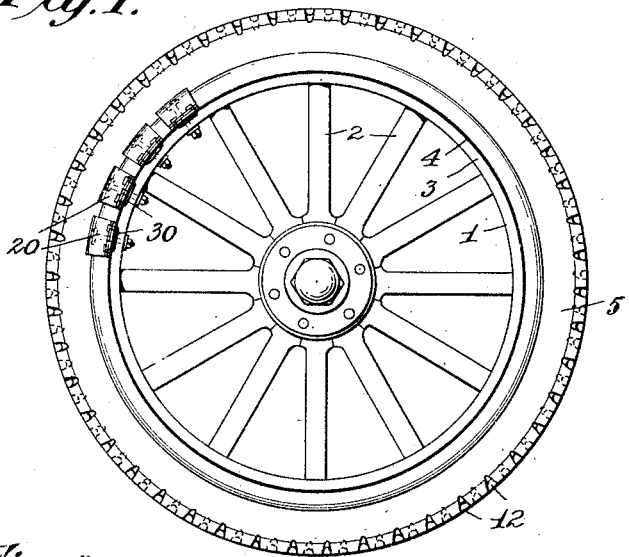
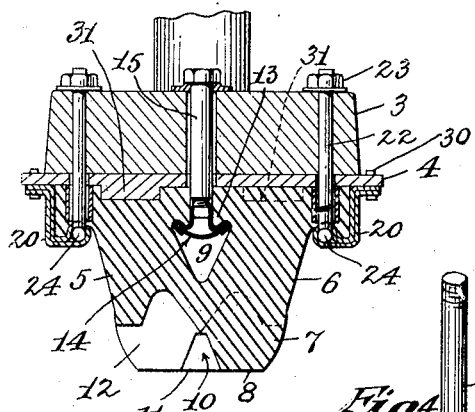
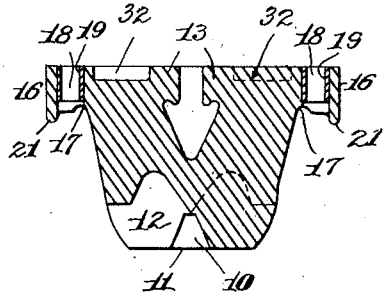
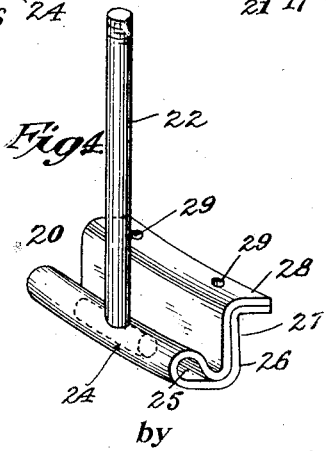
Attest:
Inventor:
Max Cyrus Overman
by E. W. Scherr, Jr. Atty.

UNITED STATES PATENT OFFICE.

MAX CYRUS OVERMAN, OF NEW YORK, N. Y.

SECURING MEANS FOR VEHICLE-TIRES.

1,203,648.  Specification of Letters Patent.  Patented Nov. 7, 1916.

Application filed January 13, 1913. Serial No. 741,675.

*To all whom it may concern:*

Be it known that I, MAX CYRUS OVERMAN, a citizen of the United States, residing at New York, in the county of New York and State of New York, have invented certain new and useful Improvements in Securing Means for Vehicle-Tires, of which the following is a specification.

My present invention relates to improvements in securing rubber tires to vehicle wheels, and by this is meant tires of rubber, a rubber composition, or a rubber substitute or equivalent.

My invention is especially valuable for use in connection with cushion tires like those of my own invention, which sustain the load by vertical compression of their side walls with accompanying thickening but without bending collapse.

The objects and advantages of my invention will appear to those skilled in the art from an understanding of the following description in connection with the drawings. These show for purposes of illustration, only one of the specific embodiments which my invention is adapted to take.

In them, Figure 1 is a side elevation of a wheel and tire provided with my improved securing means, only four of which, however, are shown, it being understood in practice that similar securing means will be provided clamping the tire to the wheel periphery all the way around the wheel; Fig. 2 is a radial section through the tire, felly and felly-band of the wheel in Fig. 1, on an enlarged scale, the parts being shown in the position assumed when the tire is clamped to the wheel; Fig. 3 is a section of the same tire shown in Fig. 2 detached from the wheel; Fig. 4 is a perspective view on an enlarged scale of one of the clamping devices; and Fig. 5 is a view of one of the staples hereinafter described.

I will now describe the specific devices of the drawings, reserving it to the claims to point out the novel features and to define the scope of the invention, it being understood that the claims will be given the due range of equivalents to which they may be entitled in view of the art.

3 is the felly of a vehicle wheel having spokes 2 and an encircling metal felly-band or rim 4.

5 is a tire of my own invention having thick, substantially straight side walls which steeply converge to a deep nose portion 7 having a wide bottom 8 which gives firm ground support for the tire immediately under its walls. Further, the tire has a longitudinal opening 9 through it with a small triangular cross section inclosed by said walls and nose portion.

10 is a longitudinal tread groove under the longitudinal opening 9 crossed at intervals by transverse webs 11, one of which is shown in elevation in Figs. 2 and 3.

12, 12 are transverse grooves or cuts extending from the tread and the tread groove upwardly under the side walls 6 and outwardly through the sides of the nose portion 7 near the tread. The side walls 6 have at their base inwardly extending clamping portions 13, 13.

The expressions "over" and the like occurring in the description and claims refer to the section of the tire when positioned as in Fig. 2.

14 is an inside clamping plate shown in end view; and 15 is bolt means extending through a hole in the wheel periphery for drawing said plate toward said periphery to compress and clamp the tire portions 13, 13 against it. This they do unrestrictedly and thereby tend to draw the material of the side walls of the tire inwardly toward the triangular opening and correspondingly prevent the outer portions of the tire from bulging outwardly toward and under the flanges. It will be understood that there are a plurality of the clamping plates 14 and connected bolt means 15 located in sufficient number all around the wheel-periphery to secure the tire properly thereto.

31, 31 represent projections, preferably rectangular in plan view on the outer side of the felly-band fitting into corresponding recesses 32 in the base of the legs of the tire whereby the drive is delivered from the felly and felly-band directly over the legs of the tire and whereby restricted necks are formed in the tire between the projections 31 and the clamping plates 14 on the one hand, and the outer clamping devices 20 (subsequently to be described) on the other, so that nothing short of disrupting the material of the tire will separate it from the wheel.

The walls 6, 6 at their base have outwardly extending clamping portions 16, 16. These in their normal or uncompressed condition in the illustrated tire (see Fig. 3) are each partially separated from its own side of the tire by an upright space 17 extending toward the felly. Each of these clamping portions 16 is pierced by a plurality of longitudinally spaced radial holes 18 having relatively short and incompressible, preferably metal, tubes 19 seated or molded therein next the base of the tire. The idea is to provide a sufficient depth of material belonging to the clamping portions 16 below each tube 19 to be compressed by the clamping means 20 to bind the clamping portion 16 securely to the wheel-periphery, with the tubes 19 acting as a stop to limit the extent of the compression so that it does not drag or draw outwardly or seriously distort the material of the sides of the tire.

21 is a circumferential bead on the underside of the clamping portion 16 which the clamping means 20 hook around as shown in Fig. 2 to bind the tire all the more securely to the wheel.

The illustrated clamping means 20 consists of a plurality of stems 22 extending through the tubes 19 and through corresponding holes in the felly and felly-band. The inner ends of these stems are threaded and fitted with nuts and washers 23. The outer ends have a right angled extension or cross-piece 24 (Fig. 4) located within the fold 25 of the bent up piece of sheet metal constituting the plate or head portion 26 of each clamp. Each of these plates 26 is bent to have a part 27 at the side of the clamping portion 16, and further has a foot 28 adapted to contact with the felly-band and to be secured thereto when said clamping portion has been sufficiently compressed.

After the clamps 20 have been tightened by means of the nuts 23 to properly secure the tire to the wheel, I prefer to secure their foot portions more or less permanently to the felly-band. For this purpose, I provide holes 29 through each foot portion corresponding with similar holes through the projecting rim 4 on the felly. Further, I provide wire staples 30 whose legs are passed upwardly through these holes and are then clenched down against the top of the rim 4. In case anything requires the removal of the tire, it is a simple matter to cut off the riveted heads of these staples, whereas meanwhile the attachment of the tire to the wheel is perfectly secure.

It will be noted that the clamps 20 constitute a sectional wheel flange and that if any one or more of them become battered or damaged, it can be replaced without disturbing the others.

What I claim is:

1. In combination, a wheel, a rubber tire having at its sides outwardly projecting basal clamping portions which, when uncompressed, are partially separated from the side of the tire by an upright space extending toward the wheel-periphery, clamping means which compresses said clamping portions toward the wheel-periphery to secure the tire thereto, and relatively incompressible means in the clamping portions extending radially outward in the given clamping portion approximately to its upright space.

2. In combination, a wheel, a rubber tire having at its sides outwardly projecting basal clamping portions, a plurality of longitudinally spaced relatively incompressible tubes extending radially outward through the clamping portions for part of their depth, and a plurality of clamping means compressing the clamping portions toward the wheel-periphery, each comprising a head and a stem, the head engaging the clamping portion, and the stem passing through the clamping portion and one of the aforesaid tubes and engaging the wheel.

3. In combination, a wheel, a rubber tire having at its sides outwardly projecting basal clamping portions, a plurality of longitudinally spaced relatively incompressible tubes extending radially outward through the clamping portions for part of their depth, and a plurality of clamping means compressing the clamping portions toward the wheel-periphery, each comprising a bolt extending from the wheel through one of the tubes, and a plate on the end of said bolt beyond the clamping portion, said plate extending laterally to the edge of the clamping portion and thence inwardly at the side of the clamping portion and having a foot adapted to contact with the wheel when the clamping portion has been compressed, and means for connecting said foot to the wheel.

4. In combination, a wheel, a rubber tire having at its sides outwardly projecting basal clamping portions which, when uncompressed, are partially separated from the side of the tire by an upright space extending toward the wheel-periphery, clamping means which compresses said clamping portions toward the wheel-periphery to secure the tire thereto, and positive stop means which prevents the clamping-means from over-compressing said outwardly projecting basal clamping-portions at the sides of the tire.

5. In combination, a wheel, a rubber tire having load-supporting walls adjacent an opening in its base, said walls having lateral basal flanges projecting both outwardly and inwardly, the latter into said opening in the base of the tire; and inner and outer clamping means for securing the tire to the wheel, the inner acting upon and compressing the inner basal flanges of the tire toward the wheel-periphery without definite limit to the degree of the compression, and the outer compressing the outer basal flanges toward the wheel periphery only to a limited extent that is short of giving an outward tendency to the tire-walls.

In testimony whereof I affix my signature in presence of two witnesses.

MAX CYRUS OVERMAN.

Witnesses:
E. W. SCHERR, Jr.,
A. C. MCDONNELL.